United States Patent [19]
Boyle

[11] 3,995,462
[45] Dec. 7, 1976

[54] LOCK FOR A GEAR SHIFT

[76] Inventor: George W. Boyle, 49 Garden St., Ridgefield Park, N.J. 07660

[22] Filed: Dec. 10, 1975

[21] Appl. No.: 639,936

Related U.S. Application Data

[63] Continuation of Ser. No. 434,533, Jan. 18, 1974, abandoned.

[52] U.S. Cl. .................................. 70/247; 70/183
[51] Int. Cl.² .................. G05G 5/00; E05B 65/12
[58] Field of Search .......... 70/181, 183, 184, 185, 70/186, 187, 245, 247, 248, 252, 256, 257; 74/495, 528

[56] References Cited
UNITED STATES PATENTS

| | | | |
|---|---|---|---|
| 1,724,918 | 8/1929 | Fehling | 70/239 |
| 1,940,979 | 12/1933 | Staples | 70/247 |
| 2,295,807 | 9/1942 | Sandberg | 70/252 |
| 2,904,987 | 9/1959 | Panico | 70/185 |
| 3,401,544 | 9/1968 | Fraser | 70/248 |
| 3,465,558 | 9/1969 | Boyle | 70/181 |

FOREIGN PATENTS OR APPLICATIONS

| | | | |
|---|---|---|---|
| 623,400 | 10/1926 | France | 70/187 |

Primary Examiner—J. Franklin Foss
Attorney, Agent, or Firm—Arthur A. March

[57] ABSTRACT

A structure for preventing the movement of a vehicle by preventing the movement of the gear shift rod. A locking unit is mounted in any suitable place within the vehicle and comprises a clamp which is connected onto a linkage rod to the gear shift and which is normally freely movable with the movement of the gear shift. The clamp unit also comprises a plate portion having an aperture into which a cable having a lock pin on one end can extend when it is desired to prevent any movement of the clamp. The cable is able to extend the pin into and out of the aperture and clamp from a place remote from the clamp itself by a plunger arrangement which is normally extended in an unlocked position but when depressed or urged inwardly causes the entry pin at the other end to move into the aperture and prevent movement of the clamp and thereby prevent movement of the gear shift. A key may be turned to maintain the plunger in locked position against the action of a spring normally urging the unit into unlocked position.

7 Claims, 2 Drawing Figures

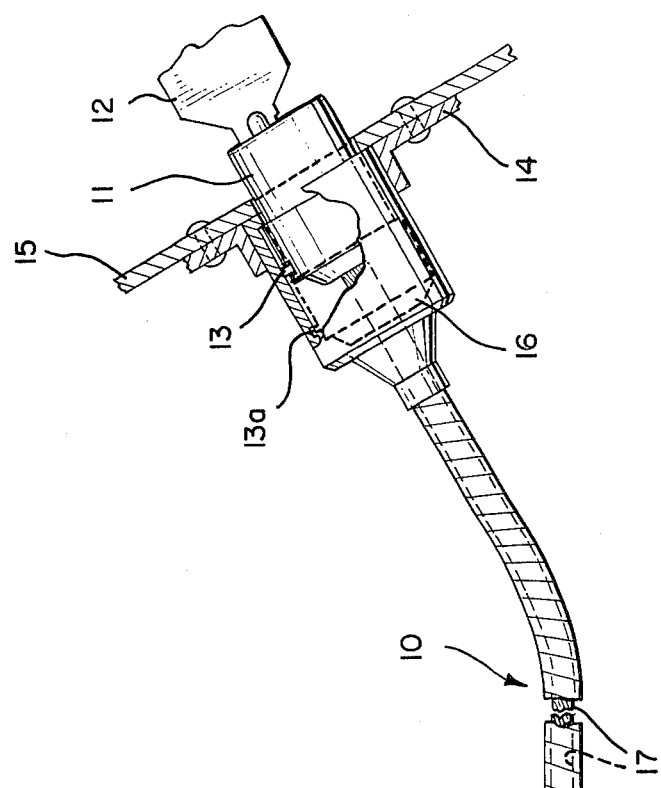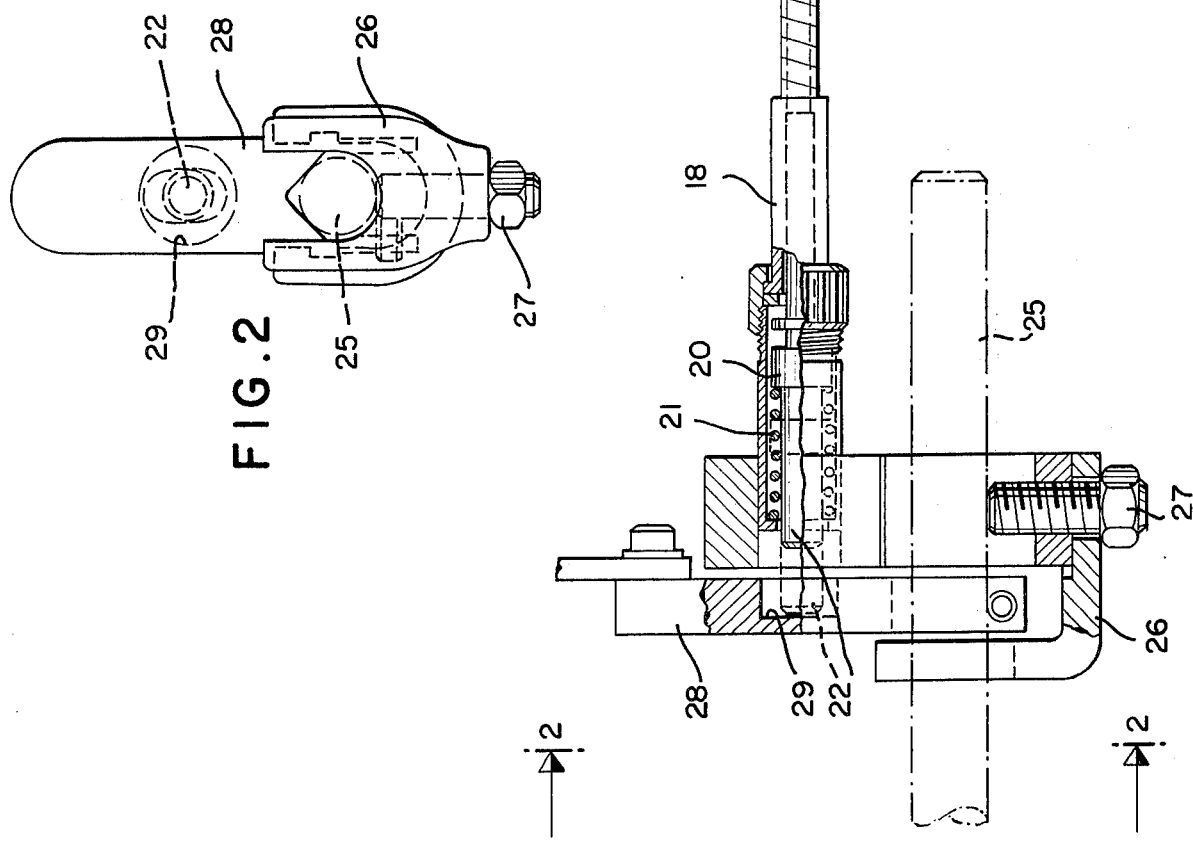

LOCK FOR A GEAR SHIFT

This is a continuation, division, of application ser. No. 434,533 filed on Jan. 18, 1974 now abandoned.

BACKGROUND OF THE INVENTION

Heretofore it has been relatively simple to move a vehicle after the engine is started by simply manipulating the gear shift into a drive position whether it be an automatic or manual gear shift. Thus once a vehicle has been started, it is relatively easy to steal the vehicle. Furthermore, in some instances, a vehicle is left unattended by an adult who fails to utilize the emergency brake but merely uses the gear parking arrangement. In some instances under such circumstances, inadvertant movement of the gear shift by children causes the car to be moved and results in accidents and bodily damage.

There have been suggestions for utilizing additional locking structure in order to prevent movement of the gear shift unless the auxiliary locking structure is first opened. Most of these suggestions include cumbersome, expensive and difficult to attach mechanism which did not satisfactorily accomplish the desired result. A structure suggested in U.S. Pat. No. 3,465,558 does prevent the operation by unauthorized persons of the gear shift to which a lock is attached. The present invention constitutes an improvement of said disclosure and provides a more flexible, easily attachable and simple arrangement for a gear shift lock auxiliary assembly.

SUMMARY OF THE INVENTION

The present invention has as one of its features the ability of the gear shift lock auxiliary assembly to be located for operation in virtually any desired place within the vehicle itself. For example, it may be mounted on the dashboard or in the glove compartment or any other desirable location. When mounted on dashboard or glove compartment, the only visible portion of the unit may be the plunger lock and key which is exposed when extending from the dashboard or from within the glove compartment. Extending from the plunger lock is the normal and usual housing for the lock structure itself. A flexible and movable cable extends from the plunger and carries on its end a locking pin. The end of the plunger carrying the locking pin is secured within a clamp which spans a linkage rod to the gear shift. This clamp frictionally engages the gear shift and is normally movable therewith when the device is in an unlocked position. The clamp unit however, has a plate provided with an opening through which the locking pin is adapted to extend in order to lock the clamp against movement and thereby preventing any movement of the gear shift. Thus, according to the present invention, inward movement of the plunger lock causes corresponding movement of the cable. This motion causes the lock pin to move into an aperture in the clamp unit and prevent movement of the clamp and thereby prevent movement of the gear shift rod. A spring normally urges the cable and plunger in the unlocking direction. However, the plunger lock may be maintained in the locked position by means of a key and detent which will in turn maintain the locking pin in the aperture and prevent any movement of the clamp and consequently any movement of the gear shift until the unit is unlocked.

BRIEF DESCRIPTION OF THE DRAWINGS

FIG. 1 is a plan view partly in section and partially broken, showing the auxiliary gear shift locking mechanism of the present invention.

FIG. 2 is a sectional view taken along the lines 2—2 of FIG. 1.

DETAILED DESCRIPTION

The auxiliary locking structure 10 of the present invention comprises a plunger lock 11 having a key way adapted to receive a key 12 and a detent 13 for the purposes hereinafter set forth. A mounting plate 14 is also provided to mount the forward end of the structure of the present invention of the dashboard 15 of the vehicle of which it is installed. It will be understood that while the device is set forth as being installed on a dashboard, it can of course be installed in the glove compartment or any other suitable and desirable location in the vehicle. Extending from the plunger lock 11 is a housing 16 containing the normal locking tumblers which can be turned into locked position upon rotating the key 12.

A transmission cable 17 extends from the plunger lock and is movable therewith within the casing 18 and housing 19. A shoulder 20 is disposed within the housing 19 and engages a spring 21 normally tensioned to urge the plunger lock 11 outwardly of the dashboard with the consequent positioning of the transmission cable 17. A locking pin 22 is carried by and is disposed at the end of the transmission cable for the purposes hereinafter set forth.

As shown, the normal linkage rod 25 is connected in the usual fashion to a gear shift or transmission rod (not shown). Secured to the linkage rod 25 is a clamp 26 which as shown spans the linkage rod. The linkage rod 25 is in frictional contact therewith through the nut and bolt connection 28. An arm 28 is located adjacent the clamp 26 as illustrated in FIGS. 1 and 2. The fixed arm 28 includes an aperture 29 which is adapted to receive the locking pin 22 at the end of the cable 17. The fixed arm is attached, by any suitable means to the vehicle frame.

When the locking pin 22 is out of the aperture in the normal position under the urging of the spring 21, the entire linkage rod and clamp 26 are free for movement in any direction upon movement of the gear shift means. In this position the plunger lock 11 extends out of the dashboard as shown in solid lines FIG. 1. In order to lock the transmission according to the present invention, it is merely necessary to depress the plunger lock 11 which will in turn move the transmission cable 17 and urge the locking pin 22 into the aperture 29. Any rotary movement of the clamp 26 is thereafter prevented by the engagement of the locking pin 22 in the aperture 29. The prevention of movement of the clamp 26 thereby prevents movement of the linkage rod 25 and the gear shift. The unit may be locked in this position by turning the key 12 so that the detent 13 engages the recess 13a provided on the wall of the housing 16 as shown in dotted lines in FIG. 1, which dotted lines also illustrate the position of the locking pin 22 in the aperture 29. The gear shift can thus not be moved without unlocking the auxiliary locking structure of the present invention which will enable the unit to then return to its normal position.

As a consequence the present invention provides an easily installable and auxiliary locking device for inhibiting theft and preventing inadvertent movement of the vehicle. Of course, the transmission linkage may be locked in any desired position.

While the invention has been described in detail, it may be understood that variations and modifications may be made without departing from the spirit thereof without in any way limiting the scope of the invention as defined in the appended claims.

What is claimed is:

1. A device for preventing the movement of a gear shift in a vehicle including a gear shift rod comprising:
    a clamp for attachment to said gear shift rod and movable therewith;
    a fixed arm adjacent the said clamp and provided with an aperture;
    a transmission cable provided with a forward end for operative attachment to said clamp and adapted to extend into said aperture to prevent movement of said clamp and said gear shift rod; and
    means for extending said end of the cable.

2. The invention as described in claim 1 including a mounting for said arm within said vehicle.

3. The invention as described in claim 1 including locking means maintaining said forward end of the cable in said aperture.

4. The invention as described in claim 3 including means normally urging said forward end of said cable out of said aperture.

5. The invention as defined in claim 3 in which said locking means are disposed adjacent the rearward end of said transmission cable.

6. The invention as defined in claim 3 in which the locking means comprise a groove and a detent movable into and out of said groove.

7. The invention as defined in claim 3 including mounting means for mounting said locking means within said vehicle.

* * * * *